July 30, 1935.  J. G. BLUNT  2,009,725
BRAKE MECHANISM
Filed Dec. 11, 1934  5 Sheets-Sheet 1
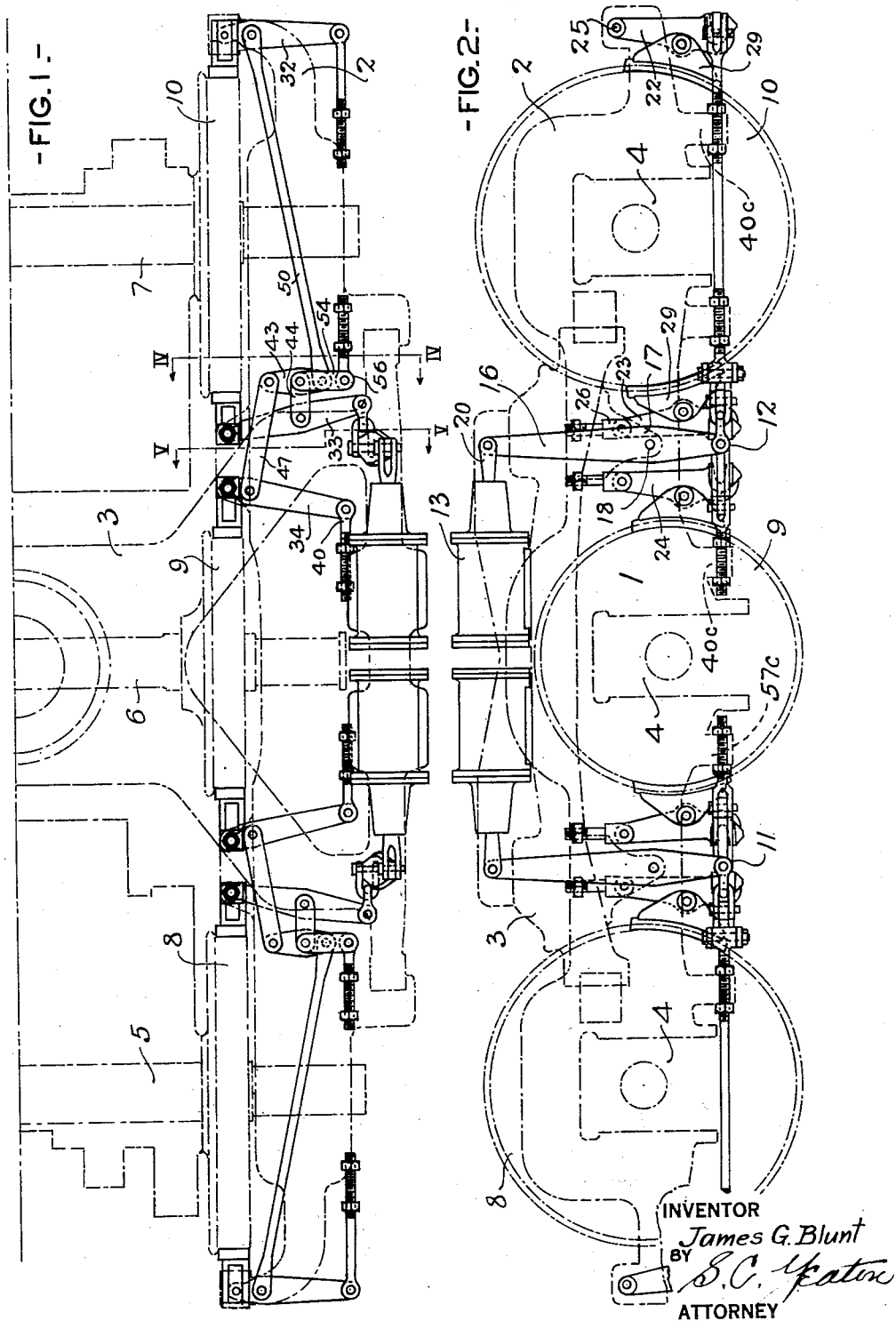
INVENTOR
James G. Blunt
BY
S.C. Yeaton
ATTORNEY July 30, 1935. J. G. BLUNT 2,009,725
BRAKE MECHANISM
Filed Dec. 11, 1934 5 Sheets-Sheet 2
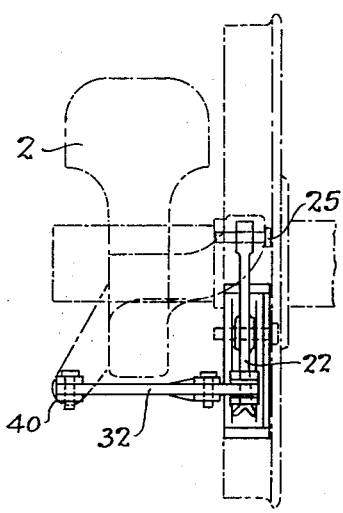
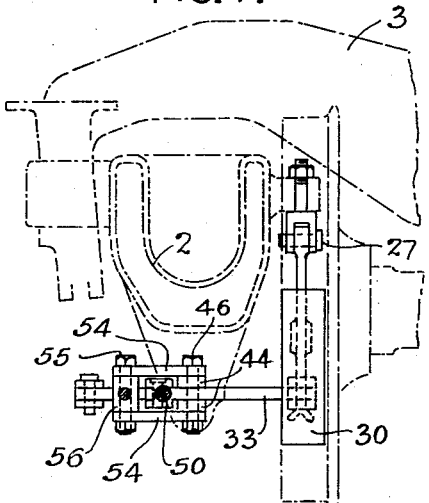
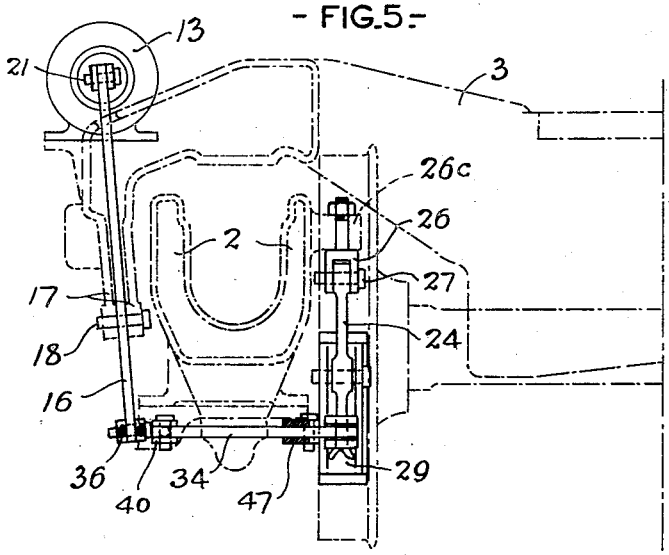
INVENTOR
James G. Blunt
BY
S. C. Yeaton
ATTORNEY

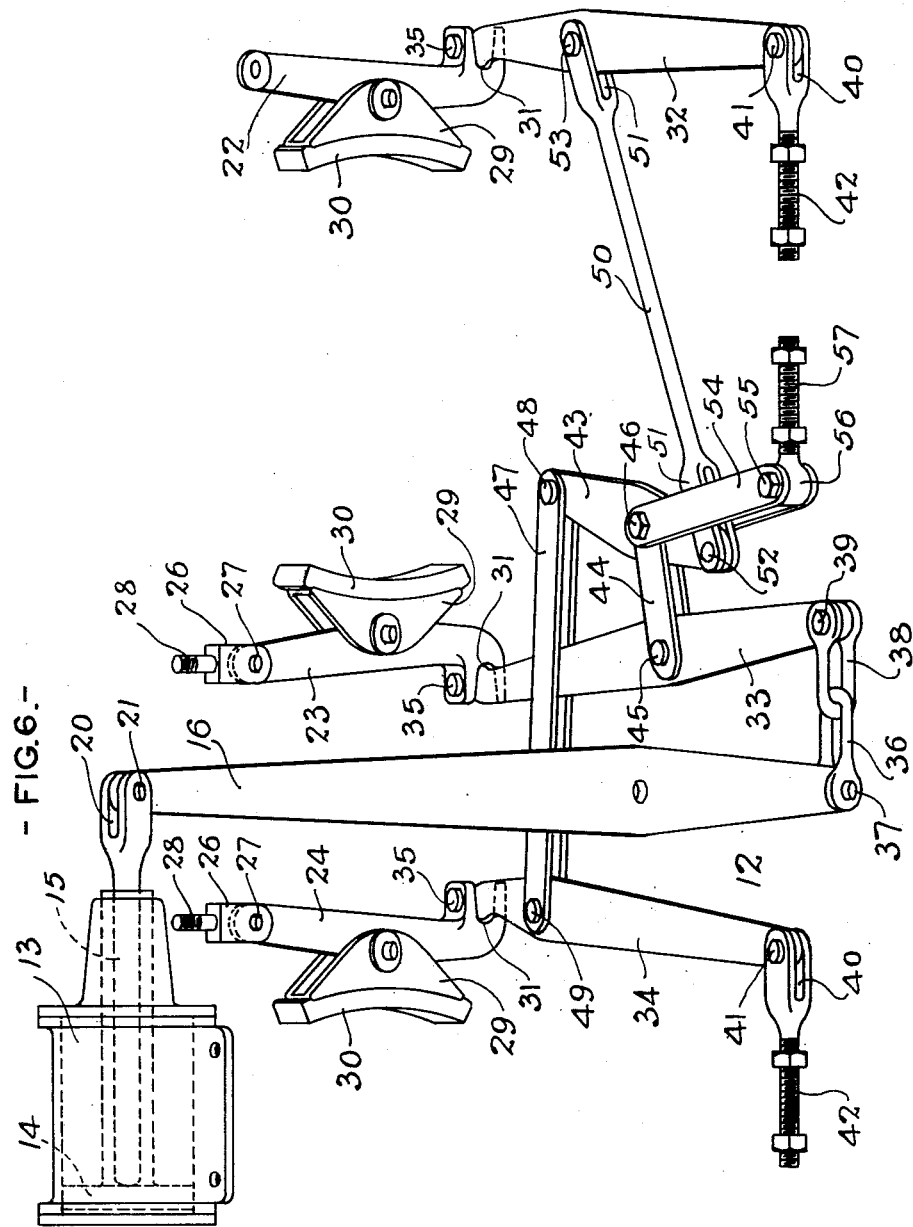

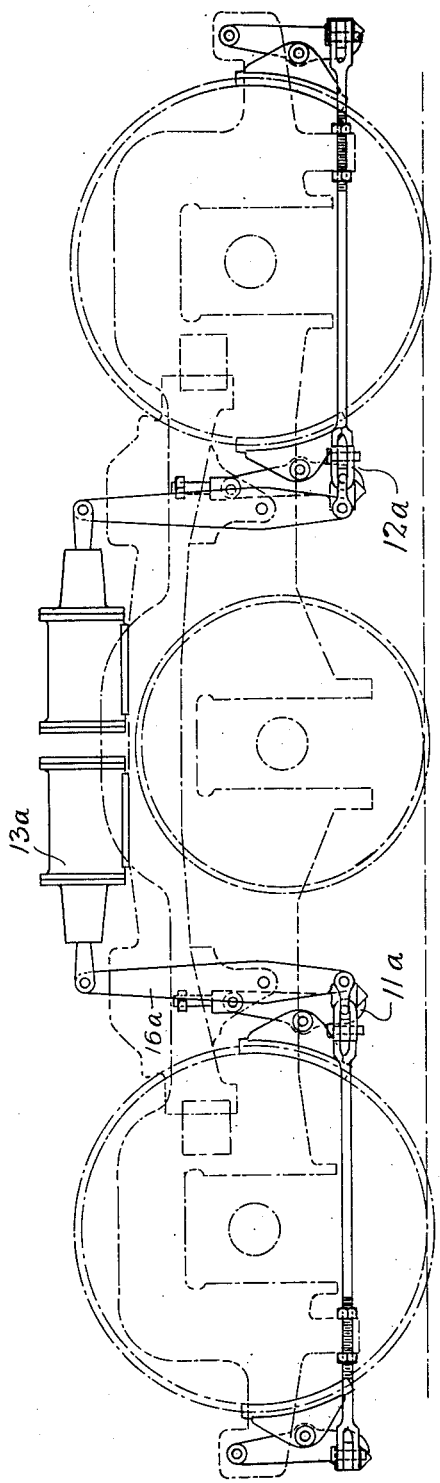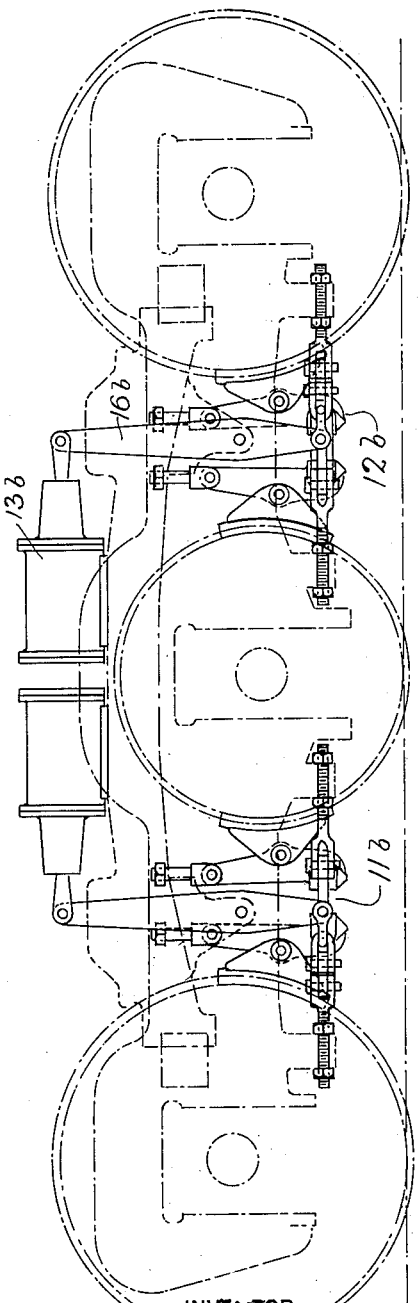

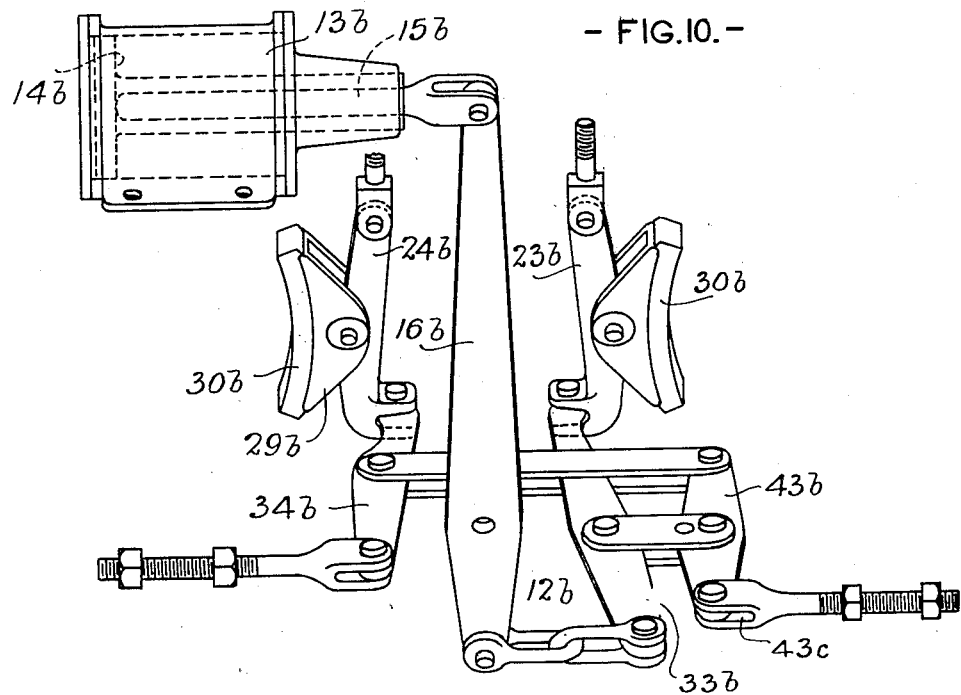
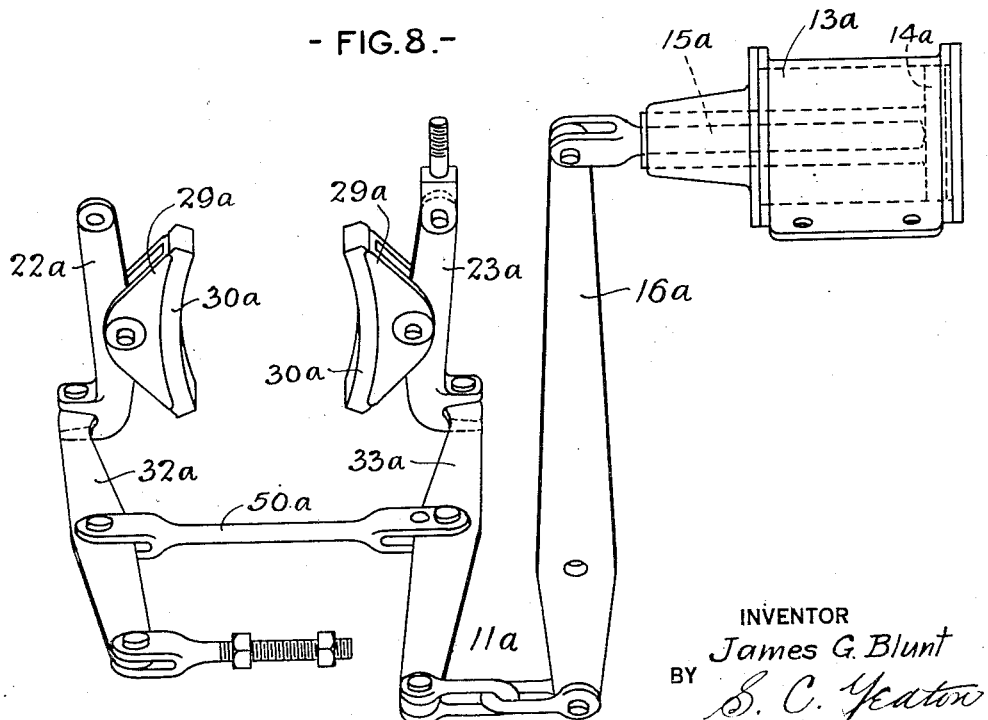

Patented July 30, 1935

2,009,725

UNITED STATES PATENT OFFICE 2,009,725

BRAKE MECHANISM

James G. Blunt, Schenectady, N. Y., assignor to American Locomotive Company, New York, N. Y., a corporation of New York Application December 11, 1934, Serial No. 756,934

10 Claims. (Cl. 188—46)

This invention relates to brake mechanism and particularly to brake rigging of the type employed in connection with the wheels of railway vehicles. The invention is especially adapted for use in connection with the wheels of railway trucks, particularly trucks having three or more pairs of wheels such as various well-known types of electric motor driven trucks.

An object of the invention is to provide brake mechanism for a truck having a plurality of pairs of wheels which mechanism includes two independent improved brake units on each side of the truck, each operable in connection with a wheel, preferably an end wheel, or each operable in connection with adjacent wheels, one preferably being an end wheel.

A further object is to provide brake mechanism for a truck having a plurality of pairs of wheels, which mechanism comprises a plurality of improved independent brake units, each unit being adapted to provide clasp brake action for one wheel, preferably an end wheel, or each unit being adapted to provide single brake action for two adjacent wheels at a side of the truck, one preferably being an end wheel, or each unit being adapted to provide brake action for two adjacent wheels at a side of the truck including clasp brake action for one wheel, preferably an end wheel, and single brake action for the adjacent wheel, the said single brake action when provided by two separate units and applied to a single wheel being in effect clasp brake action therefor.

A further object is to provide an improved brake unit particularly adapted for a vehicle having side frame members, a plurality of wheeled axles journalled therein and a bolster extending between and supported by these members which unit includes brake shoes adapted for movement to engagement with a wheel or wheels of the vehicle by a power lever operated by a working cylinder, the lever being adapted for a fulcrum connection with and the cylinder adapted to be carried by the bolster.

Other and further objects of and advantages achieved by this invention will be apparent from the following description of approved embodiments thereof.

The invention is illustrated in the accompanying drawings, wherein Figure 1 is a diagrammatic plan view of one-half of a railway truck with brake mechanism embodying this invention applied thereto, the brake mechanism being shown complete in full lines and the other parts being shown in broken lines; Figs. 2 to 5 are other diagrammatic views of the structure shown in Fig. 1, showing the parts similarly lined, Fig. 2 being a side elevation, Fig. 3 a fragmentary end view looking from the right with reference to Fig. 1, Fig. 4 a fragmentary section on the line IV—IV of Fig. 1, and Fig. 5 a section on the line V—V of Fig. 1; Fig. 6 is an enlarged diagrammatic perspective view of the right end brake unit shown in Fig. 1; Fig. 7 is a diagrammatic side elevation of the truck shown in Fig. 1 with brake mechanism embodying another form of the invention applied thereto; Fig. 8 is an enlarged diagrammatic perspective view of the left end brake unit shown in Fig. 7; Fig. 9 is a diagrammatic side elevation of the truck shown in Fig. 1 with brake mechanism embodying a third form of the invention applied thereto; and Fig. 10 is an enlarged diagrammatic perspective view of the right end brake unit shown in Fig. 9.

Referring in detail to the drawings, an electric motor truck is indicated generally by the numeral 1 (Figs. 1, 2, 7 and 9). The truck comprises a pair of side frames 2 (only one being shown), which side frames are connected by a bolster 3 in a suitable manner, the bolster being supported on the side frames by springs (not shown). Pedestal jaws 4 are provided in the side frames, three in each frame, and three axles 5, 6 and 7 are journalled in suitable boxes which are slidably mounted in the pedestal jaws and support the side frames on springs in the usual manner (the boxes and springs not being shown). Each of the axles carries two wheels, one at the inside of each of the pedestal jaws (only one wheel for each axle being shown) as indicated at 8, 9 and 10 for the respective axles 5, 6 and 7. The brake rigging of the present invention, while particularly adaptable for the type of truck illustrated, is of course adaptable for various trucks of other designs. The particular construction of the truck therefore does not comprise a part of the present invention and the details thereof will not be herein described.

The brake mechanism of each of the embodiments illustrated in the drawings of the invention comprises four independent units, two being disposed on each side of the truck at the respective ends thereof. Only the units on the one side of the truck which is shown in the drawings will be described but it will of course be understood that similar units will be provided on the opposite side of the truck for the corresponding wheels at that side.

Referring first to the embodiment of the invention illustrated in Figs. 1 to 6, the mechanism on the side of the truck which is illustrated comprises two units which are indicated generally by the numerals 11 and 12. The units 11 and 12 are of similar construction, except that one (11) is a right unit and the other (12) is a left unit. They are applied to the vehicle and operable in the same manner with their cylinders, hereinafter described, back to back. Only the unit 12 which is disposed at the right end of the truck as shown in the drawings will be described.

The unit 12 comprises an air cylinder 13 which is mounted on the bolster 3 at the outer side thereof and is provided with a piston 14 and piston rod 15.

A source of air under pressure and means for introducing and exhausting said air into and from the cylinder 13 are provided for actuating the piston. This source and means are not illustrated but may be of any well-known or approved type of construction, it being understood that the cylinders for both units of the brake mechanism on both sides of the truck will be supplied from a common source of air pressure having a single control mechanism.

A main power lever 16 is pivotally connected intermediate its ends to a bracket 17 formed on the bolster 3 by a pin 18. A jaw 20 is formed on the outer end of the piston rod 15 and the upper end of the lever 16 is pivotally connected thereto by a pin 21.

Brake hanger levers 22 and 23 are disposed at the opposite ends of the wheel 10 and a brake hanger lever 24 is disposed at the right end of the wheel 9. The lever 22 is pivotally connected at its upper end to the side frame 2 by a pin 25. A jaw member 26 is provided at the upper end of each of the levers 23 and 24. The jaw members embrace the respective lever ends and are pivotally connected thereto by pins 27. A shank 28 is formed on each jaw member 26 and is suitably secured to a lug 26c formed on the frame 2.

A brake head 29 is pivotally connected to each of the hanger levers intermediate its length. Each of the brake heads is provided with a brake shoe 30 in the usual manner, the shoes of the hanger levers 22 and 23 being adapted for engagement with the wheel 10 at opposite sides thereof and the shoe of the hanger lever 24 being adapted for engagement with the wheel 9 at the right side thereof. A jaw 31 is formed on the lower end of each of the hanger levers.

Intermediate substantially horizontally disposed levers 32, 33 and 34 are provided for each of the hanger levers 22, 23 and 24 respectively. Each intermediate lever is pivotally connected at its inner end to the jaw 31 of its respective hanger lever by a pin 35. A clevis 36 is pivotally connected by a pin 37 of the lower end of the main power lever 16 and a clevis 38 which engages the clevis 36 is similarly connected by a pin 39 to the outer end of the intermediate lever 33. The outer end of each of the intermediate levers 32 and 34 is pivotally connected to a jaw member 40 by a pin 41 and a shank 42 is formed on each jaw member and is secured to a lug 40c formed on the frame 2. The jaw members 40 both extend to the left from their respective intermediate lever ends.

A horizontal floating lever 43 is disposed at the right of lever 33. A double link 44 extends between the intermediate portions of the levers 33 and 43 and is pivotally connected at its opposite ends to these intermediate lever portions by a pin 45 and a bolt 46 respectively. A double link 47 extends between and is pivotally connected at its opposite ends to the inner end of the lever 43 and an intermediate portion (toward the inner end) of the lever 34 by pins 48 and 49. The lever 33 passes freely between the members of the link 47. A rod 50 having jaws 51 formed on its ends extends between and is pivotally connected to the outer end of the lever 43 and an intermediate portion of the lever 32 by pins 52 and 53.

A double link 54 is also pivotally connected to the intermediate portion of the lever 43, the members of this link being disposed at the outer, upper and lower sides of the respective members of the link 44 and the bolt 46 extends through the members of the link 54 as well as those of the link 44 and the lever 43. The link 54 extends outward and is connected at its outer end by a bolt 55 to an eye 56 formed on a shank 57. The shank 57 is secured to a lug 57c formed on the frame 2. The jaw 51 connected to the outer end of the lever 43 is freely movable between the members of the link 54.

In operation to apply the brake shoes, air under pressure is introduced into the cylinder 13, and the piston 14 and rod 15 are forced outwardly so as to move the upper end of the lever 16 to the right, the lever 16 thereby fulcruming on the pin 18 and pulling the outer ends of the lever 33 to the left.

The lever 33 fulcrums on the pin 45 as soon as the intermediate portion of the lever 33 is moved to the left as far as the remaining parts of the unit will permit, as hereinafter explained, and the inner end of the lever 33 is thus moved to the right so as to similarly move the lower end of the hanger lever 23, swinging it about the pin 27 and applying the brake shoe 30, which is connected therewith, to the left side of the wheel 10. With this brake shoe engaged the brake hanger lever 23 can not be moved further to the right and the pin 35 thereupon becomes the fulcrum of the lever 33 so that the further movement of the outer end of this lever to the left by the lever 16 moves the link 44 to the left together with the central portion of the lever 43, the ends of the lever 43 moving to the left as far as their connected parts will permit in the following manner:

The rod 50 is moved to the left carrying with it the central portion and hence the inner end of the lever 32, this lever fulcrumming about the pin 41. The lower end of the brake hanger lever 22 is thereby swung to the left about its pin 25 and the brake shoe 30 which is connected therewith is thus applied. When this brake shoe is applied the brake hanger lever 22 and consequently the lever 32, rod 50 and the outer end of the lever 43 can not be moved further to the left. Thereupon further movement of the lever 43 to the left is about its pin 52 and the inner end of the lever 43 is moved with the link 47 to the left thereby swinging the lever 34 to the left about its pin 41. The brake hanger lever 24 is thereby swung to the left about its pin 27 so that its brake shoe 30 is applied.

The link 54 serves to hold the central portion of the lever 43 substantially against transverse movement (inward and outward movement) or more strictly, the bolt 46 and the central portion of the lever will be permitted movement only in an arc about the bolt 55 as a center.

It will of course be apparent that the order in which the several movements of the parts takes place will be determined according to which brake shoe first becomes engaged with its respective wheel. Thus, if the brake shoe connected with the hanger lever 24 engages its wheel before the brake shoe of the hanger lever 22, movement of the bolt 46 to the left will thereupon cause the lever 43 to move about the pin 48 as a fulcrum, the outer end of the lever 43 thereby effecting the movement of the hanger lever 22 to the left to apply its shoe. Or, if one or the other or both of the shoes connected with the hanger levers 22 and 24 are applied before the shoe connected with the hanger lever 23, when further movement of the link 44 to the left is prevented, the lever 33 is swung about the pin 45 as a fulcrum and the lower end of the hanger lever 23 is swung to the right thereby applying its brake shoe. Whether the several movements of the brake shoes take place in different sequences or simultaneously is however unimportant as the application of the brake shoes will be in all events simultaneous from a practical standpoint. It will be apparent that the units 11 and 12 provide clasp brake action for their respective end wheels 8 and 10 and single brake action for the wheel 9, the single brake action of the two units for the wheel 9 however being in effect clasp brake action therefor.

The unit 11 and the units on the opposite side of the truck as aforementioned are constructed similarly and will be operated simultaneously with and in the same manner as the unit 12.

Referring to the embodiment of the invention illustrated in Figs. 7 and 8, the mechanism on one side of the truck only is illustrated but similar mechanism is of course provided at the opposite side of the truck. This embodiment is similar in many respects to the first described embodiment and similar parts of the mechanism of this embodiment which is shown are designated in the drawings by the same reference numerals, with the letter "a" affixed.

The mechanism of this embodiment (on each side) comprises two units 11a and 12a which are of similar construction and are applied to the truck and operable in the same manner. Only the unit 11a which is disposed at the left end of the truck as shown in Fig. 7 will be described. The parts of this unit 11a which correspond to the parts of the unit 12 (or more strictly, to the parts of the unit 11, as the units 11a and 11 are disposed at the same end of the truck) include the cylinder 13a, piston 14a, piston rod 15a, levers 16a, 33a and 32a, brake hanger levers 23a and 22a, and brake heads 29a and shoes 30a. The lever 16a is operably connected with the cylinder 13a and with the lever 33a; the lever 32a and the hanger levers 23a and 22a are connected with the truck; and the hanger levers are connected with the levers 33a and 32a, all in the same manner as described with reference to the corresponding parts of the first embodiment.

In this embodiment a rod 50a replaces the rod 50 and engages at one of its ends the lever 32a in the same manner as the rod 50 engages the lever 32. The opposite end of the rod 50a however is pivotally connected with the central portion of the lever 33a. The other parts of the unit 12 are eliminated in the present instance. These parts include the lever 43, the links 44, 54 and 47, the eye 56 and the various parts connected at the left end of the link 47.

The operation of this embodiment is somewhat similar to the operation of the first described embodiment excepting that it is of course considerably more simple. As soon as the inner end of the lever 33a is held against further movement by its adjacent brake shoe becoming engaged, this lever fulcrums about its inner end so that further movement thereof to the right moves the rod 50a and the lever 32a in the same direction thereby effecting engagement of the brake shoe adjacent thereto. If this last mentioned brake shoe is engaged first, then as the rod 50a will be held against further movement to the right the lever 33a will thereupon fulcrum about its pivotal connection with the rod 50a and the brake shoe adjacent the lever 33a will be thus moved to engaged position. It will be obvious that the units 11a and 12a provide clasp brake action for the wheels 8 and 10 but provide no brake action for the wheel 9.

Referring to the embodiment of the invention illustrated in Figs. 9 and 10 here also the mechanism on one side of the truck only is illustrated and similar mechanism is also of course provided at the opposite side of the truck. This embodiment is also similar in many respects to the first described embodiment and similar parts of the mechanism of this embodiment which is shown are designated in the drawings by the same reference numerals with the letter "b" affixed.

The mechanism of this embodiment (on each side) comprises two units 11b and 12b which are of similar construction and are applied to the truck and operable in the same manner. Only the unit 12b which is disposed at the right end of the truck will be described.

The unit 12b includes a corresponding part for each part of the unit 12 excepting the link 54 and its eye 56 and the rod 50 and all of the parts connected at the right end thereof as shown in the drawings which parts are eliminated in the unit 12b. The outer end of the lever 43b which corresponds to the lever 43 is engaged by and pivotally connected to a jaw 43c, the shank of which extends to the right and is connected to the frame 2 substantially in the same manner as the jaws 40.

The operation of the unit 12b is substantially the same as the operation of the unit 12 excepting that, as the pivotal connection at the outer end of the lever 43b is fixed, the only movement of this lever is about this pivotal connection and omitting of course the brake shoe at the right end and its associated parts. It will be obvious that the units 11b and 12b provide single brake action for each of the wheels 8, 9 and 10 which in effect provides clasp brake action for the wheel 9.

While there have been hereinbefore described several approved embodiments of the invention whereby the objects thereof are as is obvious attained, it will be understood that various changes and modifications may be made as to form, structure and arrangement of parts without departing from the spirit of the invention and that all such changes and modifications as fall within the scope of the appended claims are contemplated as a part of this invention.

The invention claimed and desired to be secured by Letters Patent is:

1. In a railway truck having three wheeled axles, brake mechanism including two independent units disposed at one side of said truck, each of said units comprising at least two brake shoes, one of said shoes being adapted for engagement with the wheel of an end axle at said side of said truck and another of said shoes being adapted for engagement with the wheel of the intermediate axle at said side of said truck adjacent the first said wheel, a main lever fulcrummed between its ends to a part of said truck, means operably connecting said shoes with one end of said lever, operating means carried by said truck, and means operably connecting said operating means with the other end of said lever.

2. In a railway truck having three wheeled axles, brake mechanism including two independent units disposed at one side of said truck, each of said units comprising three brake shoes, two of said shoes being adapted for engagement with a wheel of an end axle at said side of said truck at the respective opposite outer and inner end faces of said wheel and the third said shoe being adapted for engagement with the wheel of the intermediate axle at said side of said truck at the end face of the last said wheel adjacent said inner end face, a main lever operably connected with said shoes, and operating means operably connected with said main lever.

3. In a railway truck having three wheeled axles, brake mechanism including two independent units disposed at one side of said truck, each of said units comprising three brake shoes, two of said shoes being adapted for engagement with a wheel of an end axle at said side of said truck at the respective opposite outer and inner end faces of said wheel and the third said shoe being adapted for engagement with the wheel of the intermediate axle at said side of said truck at the end face of the last said wheel adjacent said inner end face, a main lever fulcrummed between its ends to a part of said truck, means operably connecting said shoes with one end of said lever, operating means carried by said truck, and means operably connecting said operating means with the other end of said lever.

4. In a railway truck having a pair of side frame members, a bolster extending between and supported by said members and a plurality of wheeled axles journalled in said members, brake mechanism comprising a brake shoe carried by one of said members adapted for engagement with a wheel of one of said axles; a main lever fulcrummed between its ends to said bolster; means operably connecting said shoe with one end of said lever; a working cylinder carried by said bolster; and means operably connecting said cylinder with the other end of said lever.

5. Brake mechanism for a railway vehicle comprising a plurality of brake shoes each adapted for engagement with a wheel of said vehicle; a hanger lever for each of said shoes operably connected therewith and adapted to be carried by said vehicle; an intermediate lever for each of said hanger levers operably connected therewith at one of its ends; means operably connecting said intermediate levers with each other; a main lever adapted for pivotal connection between its ends with a part of said vehicle; operating means connected with said main lever at one end thereof; and means operably connecting said main lever at its other end with one of said intermediate levers at the other end thereof, the other said intermediate lever or levers being adapted for pivotal connection with a fixed part of said vehicle, whereby said engagement of said shoes will be effected by operative movement of said operating means.

6. Brake mechanism for a railway vehicle comprising a plurality of brake shoes each adapted for engagement with a wheel of said vehicle; a hanger lever for each of said shoes operably connected therewith intermediate its ends and adapted for pivotal connection at one of its ends with a fixed part of said vehicle; an intermediate lever for each of said hanger levers operably connected at one of its ends with the other end of its respective hanger lever; means extending between and operably connecting the intermediate portions of said intermediate levers; a main lever adapted for pivotal connection between its ends with a part of said vehicle; means connecting one end of said main lever with the other end of one of said intermediate levers, the other end or ends of the other said intermediate lever or levers being adapted for pivotal connection with a fixed part of said vehicle; and operating means connected with said main lever at the other end thereof, whereby said engagement of said shoes will be effected by operative movement of said operating means.

7. Brake mechanism for a railway vehicle comprising two brake shoes adapted for engagement with a wheel of said vehicle at the respective opposite end faces thereof; a substantially vertical hanger lever for each of said shoes operably connected therewith intermediate its ends and adapted for pivotal connection at its upper end with a fixed part of said vehicle; an intermediate lever for each of said hanger levers operably connected at one of its ends with the lower end of its respective hanger lever, one of said intermediate levers being adapted at its other end for pivotal connection with a fixed part of said vehicle; link means extending between said intermediate levers and pivotally connected therewith intermediate the respective ends thereof; a main lever adapted for pivotal connection between its ends with a part of said vehicle; means connecting one end of said main lever with the other end of the other of said intermediate levers; and operating means connected with said main lever at the other end thereof, whereby said engagement of said shoes will be effected upon operative movement of said operating means.

8. Brake mechanism for a railway vehicle comprising a plurality of brake shoes, one of said shoes being adapted for engagement with an end face of one of the wheels of said vehicle and another of said shoes being adapted for engagement with an end face of another of said wheels of said vehicle adjacent the first said end face; a substantially vertical hanger lever for each of said shoes operably connected therewith intermediate its ends and adapted for pivotal connection at its upper end with a fixed part of said vehicle; three intermediate levers including a first intermediate lever pivotally connected at one of its ends with the lower end of one of said hanger levers and adapted at its other end for pivotal connection with a fixed part of said vehicle, a second intermediate lever connected at one of its ends with the lower end of the other of said hanger levers, and a third intermediate lever adapted for pivotal connection at one of its ends with a fixed part of said vehicle; a main lever adapted for pivotal connection between its ends with a part of said vehicle; means connecting one end of said main lever with the other end of said second intermediate lever; link means extending between and pivotally connected at its opposite ends with the intermediate portions of said second intermediate lever and said third intermediate lever; link means extending between and pivotally connected at its opposite ends to the intermediate portion of said first intermediate lever and the other end of said third intermediate lever; and operating means connected with the other end of said main lever, whereby said engagement of said shoes will be effected by operative movement of said operating means.

9. Brake mechanism for a railway vehicle comprising three brake shoes, two of said shoes being adapted for engagement with a wheel of said vehicle at the respective opposite outer and inner end faces of said wheel and the third said shoe being adapted for engagement with another wheel of said vehicle at the end face thereof adjacent said inner end face; a substantially vertical hanger lever for each of said shoes operably connected therewith intermediate its ends and adapted for pivotal connection at its upper end with a fixed part of said vehicle; four intermediate levers including a first intermediate lever pivotally connected at one of its ends with the lower end of one of said hanger levers and adapted for pivotal connection at its other end with a fixed part of said vehicle, a second intermediate lever pivotally connected at one of its ends with the lower end of another of said hanger levers, a third intermediate lever pivotally connected at one of its ends with the lower end of the third said hanger lever and adapted for pivotal connection at its other end with a fixed part of said vehicle, and a fourth floating intermediate lever; link means extending between and pivotally connected at its opposite ends to the intermediate portion of said first intermediate lever and one end of said fourth intermediate lever; link means extending between and pivotally connected at its opposite ends to the other end of said fourth intermediate lever and the intermediate portion of said third intermediate lever; link means extending between and pivotally connected at its opposite ends to the intermediate portion of said second intermediate lever and the intermediate portion of said fourth intermediate lever; link means pivotally connected at one of its ends with said intermediate portion of said fourth intermediate lever and adapted for pivotal connection at its opposite end with a fixed part of said vehicle; a main lever adapted for pivotal connection intermediate its ends with a part of said vehicle; link means extending between and connected at its opposite ends to one end of said main lever and the other end of said second intermediate lever; and operating means connected with said main lever at the other end thereof, whereby the engagement of said shoes will be effected by operative movement of said operating means.

10. In a railway truck having a pair of side frame members, a bolster extending between and supported by said members and a plurality of wheeled axles journalled in said members, brake mechanism comprising a brake shoe carried by one of said members adapted for engagement with a wheel of one of said axles; a main lever fulcrummed to said bolster; means operably connecting said shoe with said lever; a working cylinder carried by said bolster; and means operably connecting said cylinder with said lever.

JAMES G. BLUNT.